US011341745B1

(12) United States Patent
McDowell et al.

(10) Patent No.: US 11,341,745 B1
(45) Date of Patent: May 24, 2022

(54) UNRESOLVED OBJECT TARGET DETECTION USING A DEEP NEURAL NETWORK

(71) Applicant: Lockheed Martin Corporation, Bethesda, MD (US)

(72) Inventors: William K. McDowell, Sanford, FL (US); Nicholas S. Shorter, Orlando, FL (US); Keith P. Rausch, Orlando, FL (US); Cameron J. Izzi, Apollo Beach, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 154 days.

(21) Appl. No.: 16/683,830

(22) Filed: Nov. 14, 2019

(51) Int. Cl.
| | | |
|---|---|---|
| *G06V 20/20* | (2022.01) |
| *G06F 17/16* | (2006.01) |
| *G06F 17/18* | (2006.01) |
| *G06N 3/04* | (2006.01) |
| *G06N 3/08* | (2006.01) |
| *G06T 7/00* | (2017.01) |

(52) U.S. Cl.
CPC .............. *G06V 20/20* (2022.01); *G06F 17/16* (2013.01); *G06F 17/18* (2013.01); *G06N 3/0472* (2013.01); *G06N 3/08* (2013.01); *G06T 7/97* (2017.01); *G06T 2207/20081* (2013.01); *G06T 2207/20084* (2013.01)

(58) Field of Classification Search
CPC ..... G06K 9/00671; G06F 17/18; G06F 17/16; G06N 3/08; G06N 3/0472; G06T 7/97; G06T 2207/20081; G06T 2207/20084
See application file for complete search history.

(56) References Cited

U.S. PATENT DOCUMENTS

2016/0328646 A1* 11/2016 Lin ..................... G06K 9/4628
2017/0272639 A1* 9/2017 Bronstein .............. G06K 9/209
(Continued)

OTHER PUBLICATIONS

Abdelfattah, A. "Image Classification using Deep Neural Networks—A beginner friendly approach using TensorFlow," Jul. 27, 2017, https://medium.com/@tifa2up/image-classification-using-deep-neural-networks-a-beginner-friendly-approach-using-tensorflow-94b0a090ccd4, 13 pages.

(Continued)

*Primary Examiner* — John W Lee
(74) *Attorney, Agent, or Firm* — Withrow & Terranova, PLLC

(57) ABSTRACT

A computing device receives a first plurality of detector element values that quantifies electromagnetic radiation (EMR) of a scene received by each detector element of an array of detector elements of a sensor in an optical system, the first plurality of detector element values including a quantification of EMR received from at least one unresolved object in the scene. A deep neural network processes a second plurality of detector element values that is based on the first plurality of detector values by convolving weight matrices over the second plurality of detector element values to generate an output image, at least some of the weight matrices generated at least in part based on a point spread function of the optical system. The output image is processed to generate a probability image that contains probability information that the at least one unresolved object is or is not a target object.

16 Claims, 7 Drawing Sheets

(56) References Cited

U.S. PATENT DOCUMENTS

| | | | |
|---|---|---|---|
| 2018/0174046 A1 | 6/2018 | Xiao et al. | |
| 2018/0204111 A1 | 7/2018 | Zadeh et al. | |
| 2018/0247164 A1 | 8/2018 | Yao et al. | |
| 2018/0373978 A1* | 12/2018 | Yu | G06N 3/08 |
| 2020/0194127 A1* | 6/2020 | Choi | G16H 50/20 |
| 2021/0248459 A1* | 8/2021 | Li | G06N 3/08 |

OTHER PUBLICATIONS

Author Unknown, "Why convolutional neural networks belong to deep learning?" 2015, Cross Validated, https://stats.stackexchange.com/questions/146413/why-convolutional-neural-networks-belong-to-deep-learning, 2 pages.

Cornelisse, D., "An intuitive guide to Convolutional Neural Networks," Apr. 24, 2018, freeCodeCamp, https://medium.freecodecamp.org/an-intuitive-guide-to-convolutional-neural-networks-260c2de0a050, 14 pages.

Cowart, A. et al., "The Detection of Unresolved Targets Using the Hough Transform," Computer Vision, Graphics, and Image Processing, vol. 21, 1983, pp. 222-238.

Chrzanowski, K., "Testing Thermal Imagers: Practical Guide," 2010, Military University of Technology, Warsaw, Poland, https://www.inframet.com/Literature/Testing%20thermal%20imagers.pdf, 172 pages.

Chu, T., "Tensorflow and Deep Learning part 3," accessed Jul. 2018 from https://sites.google.com/site/nttrungmtwiki/home/it/data-science--python/tensorflow/tensorflow-and-deep-learning-part-3?tmpl=/system/app/templates/print/&showPrintDialog=1, 3 pages.

Cui, Z. et al., "SAR Target Recognition in Large Scene Images via Region-Based Convolutional Neural Networks," Remote Sensing, vol. 10, No. 776, May 2018, MDPI, 18 pages.

Daniels, J., "Hackemoon," accessed Jul. 2018 from https://cdn-images-1 medium.com/max/1000/1*_D5ZvufDS38WkhK9rK32hQ.jpeg, 1 page.

Deshpande, A., "A Beginner's Guide to Understanding Convolutional Neural Networks," Jul. 29, 2016, https://adeshpande3.github.io/adeshpande3.github.io/A-Beginner's-Guide-To-Understanding-Convolutional-Neural-Networks/, 11 pages.

Dumoulin, V. et al., "Convolution arithmetic," GitHub, Mar. 23, 2016, https://github.com/vdumoulin/conv_arithmetic, 3 pages.

Edmondson, R. et al., "Single-Frame Image Processing Techniques for Low-SNR Infraredimagery," Infrared Technology and Applications XXXIV, Proc. of SPIE, vol. 6940, 69402G, 2008, 12 pages.

Khan, M. et al., "Automatic Target Detection in Satellite Images using Deep Learning," Journal of Space Technology, vol. 7, No. 1, Jul. 2017, 6 pages.

Lee, H. et al., "Convolutional Deep Belief Networks for Scalable Unsupervised Learning of Hierarchical Representations," Proceedings of the 26th International Conference on Machine Learning, 2009, Montreal, Canada, https://web.eecs.umich.edu/~honglak/icml09-ConvolutionalDeepBeliefNetworks.pdf, 8 pages.

Louppe, G., "3d-conv.gif," GitHub, accessed Jul. 2018 from https://github.com/glouppe/info8010-deep-learning/blob/master/figures/lec3/3d-conv.gif, 1 page.

Sachdeva, A., "Deep Learning for Computer Vision for the average person," accessed Jun. 2018 from https://medium.com/diaryofawannapreneur/deep-learning-for-computer-vision-for-the-average-person-861661d8aa61, 3 pages.

Yang, C. et al. "Vehicle Object Detection in Remote Sensing Imagery Based on Multi-Perspective Convolutional Neural Network," International Journal of Geo-Information, vol. 7, No. 249, Jun. 2018, 16 pages.

* cited by examiner

UNRESOLVED OBJECT TARGET DETECTION USING A DEEP NEURAL NETWORK

BACKGROUND

There are many circumstances where real-time detection of unresolved objects is important, in both military and non-military contexts. For example, it would be desirable to warn a pilot of an aircraft that an unresolved object is a bird or a drone that would threaten the safety of the aircraft in the event of a collision.

SUMMARY

The embodiments implement unresolved object target detection, do not require high-resolution sensors or costly lenses, and also, in some embodiments, implement unresolved object target detection via a single image of a scene, thereby facilitating a substantially lower cost target detection system that can properly classify an object as a target more quickly and accurately than a conventional target detection system.

In one embodiment, a method is provided. The method includes receiving, by a computing device, a first plurality of detector element values that quantifies electromagnetic radiation (EMR) of a scene received by each detector element of an array of detector elements of a sensor in an optical system, the first plurality of detector element values including a quantification of EMR received from at least one unresolved object in the scene. The method further includes processing, by a deep neural network executing on a computing device, a second plurality of detector element values that is based on the first plurality of detector values by convolving a plurality of weight matrices over the second plurality of detector element values to generate an output image, at least some of the weight matrices generated at least in part based on a point spread function of the optical system. The method further includes processing, by the computing device, the output image to generate a probability image that contains probability information that the at least one unresolved object is a target object or is not a target object.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
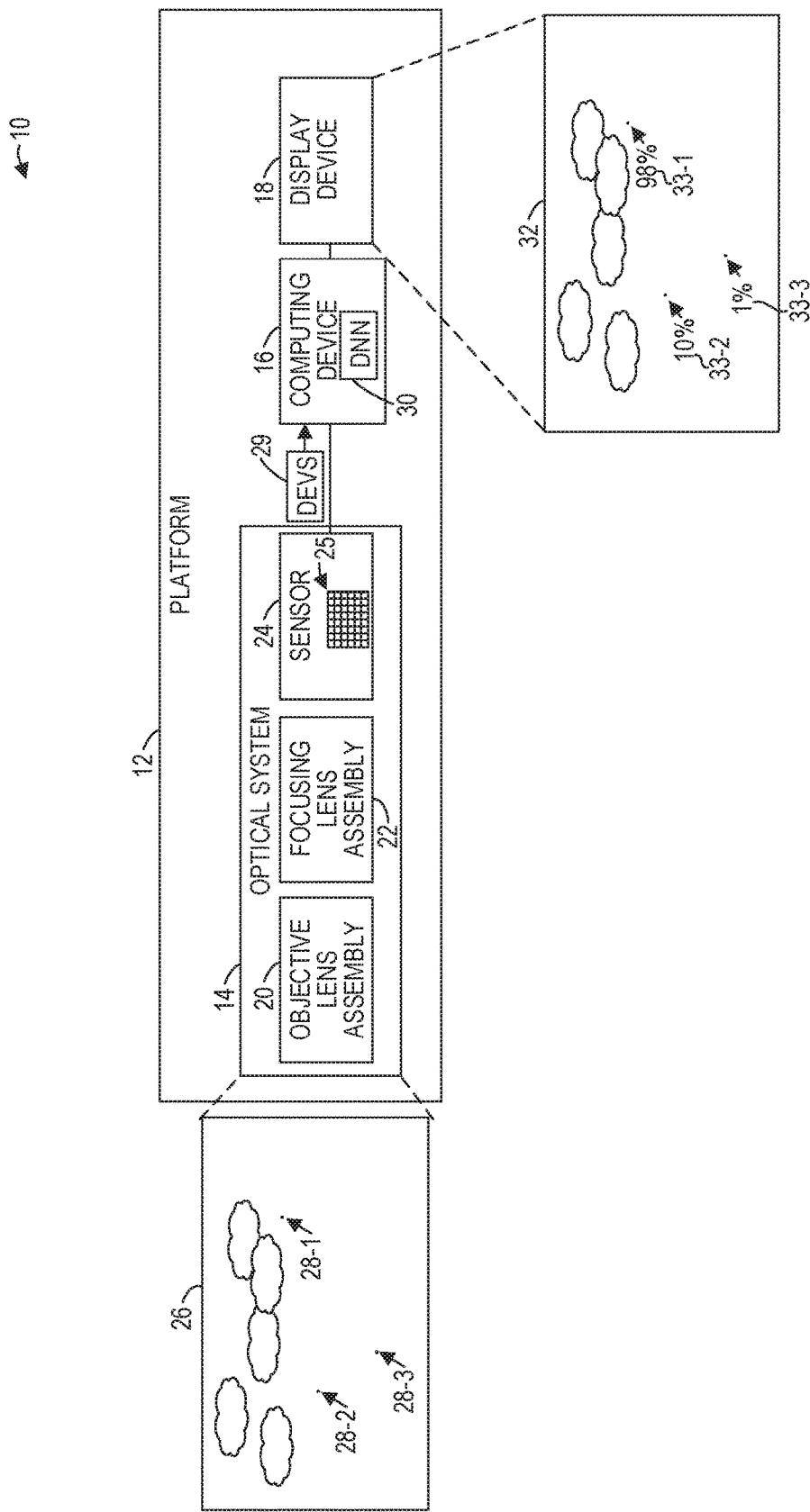
FIG. 1 is a block diagram of an environment in which embodiments disclosed herein may be practiced.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

There are many circumstances where real-time detection of unresolved objects is important, in both military and non-military contexts. For example, it would be desirable to warn a pilot of an aircraft that an unresolved object is a bird or a drone that would threaten the safety of the aircraft in the event of a collision.

The embodiments disclosed herein implement unresolved target detection using a deep neural network. An unresolved object in a scene may, for example, simply be background clutter that does not warrant the attention of the crew of an airplane, or may be a target, such as an enemy aircraft or a bird, that does warrant the attention of the crew of the airplane. As used herein, the term "unresolved object" refers to an object having an apparent size smaller than an instantaneous field of view (IFOV) of a detector element of a sensor of an optical system. As used herein, the term "unresolved target" is an unresolved object that has been classified as being, or potentially being, a target. The term "target" as used herein refers to a particular item that is being identified. The target, for example, could be an aircraft, a goose, a balloon, or any other desired item, and the term target does not imply that the object is a threat, although depending on the particular implementation, such as in a military context, a target may be a threat.

Conventional target detection systems often utilize costly lenses and high-resolution sensors in an attempt to resolve all objects in a scene. Conventional target detection systems also typically require multiple images of the scene to correctly classify a resolved object as a target, increasing the timeline from object detection to threat identification, during which time the distance between the target and the platform may be decreasing. Such conventional threat detection systems also require relatively high-power processing devices in order to process multiple high-resolution images, and substantial bandwidth requirements between components to transfer the high-resolution data. Thus, conventional target detection systems can be relatively costly. Conventional target detection systems are implemented via algorithms maintained by engineers that must "fine-tune" the algorithms based on different environments. For example, clutter in one location of the world may look different than clutter in another location in the world, and the particular targets that are being sought may differ from application to application. Each such difference requires an engineer to manually modify the algorithm to provide the desired discrimination between targets and clutter, and to properly classify an object as a target. Manual software development is expensive and time-consuming.

The embodiments implement unresolved object target detection, do not require high-resolution sensors or costly lenses, and also, in some embodiments, implement unresolved object target detection via a single image of a scene, thereby facilitating a substantially lower cost target detection system that can properly classify an object as a target more quickly and accurately than a conventional target detection system. The embodiments utilize a deep neural network that self learns, eliminating or at least vastly reducing the time necessary for human involvement in altering the target detection system to identify new targets amongst new clutter, and thus the novel target detection system disclosed herein can rapidly adapt to new environments.

FIG. 1 is a block diagram of an environment 10 in which embodiments disclosed herein may be practiced. The environment 10 includes a platform 12, which in turn includes an optical system 14, a computing device 16 and a display device 18. The platform 12 may be a non-moving structure or a mobile apparatus, such as an airplane, a truck, a boat, or the like. The optical system 14 includes an objective lens assembly 20, which comprises one or more objective lenses, and a focusing lens assembly 22, which comprises one or more lenses configured to focus an image on a downstream sensor 24 located at an image plane of the optical system 14. The optical system 14 has a point spread function that describes the response of the optical system 14 to a point source or point object.

The sensor 24 comprises an array of a plurality of detector elements 25 sensitive to electromagnetic radiation (EMR) in a desired waveband, such as a visible waveband, an infrared waveband, a near-infrared waveband, an ultraviolet waveband, or any other desirable waveband. The array of detector elements 25 may be arranged in a matrix and comprise a number of columns and rows of detector elements 25 positioned adjacent to one another. The array of detector elements 25 may have any desired resolution defined by the number of detector elements 25, including, by way of non-limiting example, a 1.3 megapixel resolution arranged in a 1024×1280 matrix.

While the sensor 24 may be sensitive to any desired waveband, in some embodiments, the sensor 24 is a focal plane array comprising a plurality of detector elements 25 sensitive to EMR in the short-wavelength infrared waveband between about 1.4-3 micrometers. In some embodiments, the sensor 24 is a focal plane array comprising a plurality of detector elements 25 sensitive to EMR in the mid-wavelength infrared waveband between about 3-8 micrometers. In some embodiments, the sensor 24 is a focal plane array comprising a plurality of detector elements 25 sensitive to EMR in the long-wavelength infrared waveband between about 8-15 micrometers. In some embodiments, the sensor 24 is a complementary metal oxide semiconductor (CMOS) or charge coupled device (CCD) sensor comprising a plurality of detector elements 25 sensitive to EMR in the near-infrared and visible waveband between about 400 nanometers and 1.1 micrometers.

The optical system 14 has a field of view which encompasses, at an instance in time, a scene 26. In this example, the scene 26 includes three unresolved objects 28-1-28-3. EMR from the scene 26 is received by the optical system 14 and sensed (i.e., detected) by the plurality of detector elements 25 of the sensor 24. Each respective detector element 25 of the sensor 24 generates a detector element value (DEV) 29 that quantifies the EMR received by the respective detector element 25. The detector element values 29 can be received by the computing device 16 and processed, as will be described in greater detail below, by a deep neural network 30. As used herein, the term "deep neural network" refers to a neural network that has two or more hidden layers. The deep neural network 30 may comprise, by way of non-limiting example, a convolutional neural network, a recurrent neural network, a multilayer perceptron neural network, or the like. The deep neural network 30 includes weight matrices that are generated based at least in part on the point spread function of the optical system 14. The deep neural network 30 outputs probability values, sometimes referred to as an image, that correspond to the detector elements 25 in the sensor 24. Each probability value corresponds to one of the detector elements 25, and identifies a probability that the EMR captured by the corresponding detector element 25 contains an unresolved target.

The computing device 16 may, in some embodiments, utilize the probability values to present an image 32 on the display device 18 that depicts the scene 26, and, in this example, includes indicia 33-1-33-3 that identifies the probability that an unresolved object 28-1-28-3 is an unresolved target.

While for purposes of illustration the optical system 14 and computing device 16 are illustrated as being in the same platform 12, in other embodiments, the optical system 14 can be separate from the computing device 16, including geographically distant from the computing device 16. In some embodiments, the optical system 14 may be in a moving platform, such as in a drone or other aerial vehicle, and the computing device 16 may be in a stationary platform, or may be in a different aerial vehicle.

Figure 2:
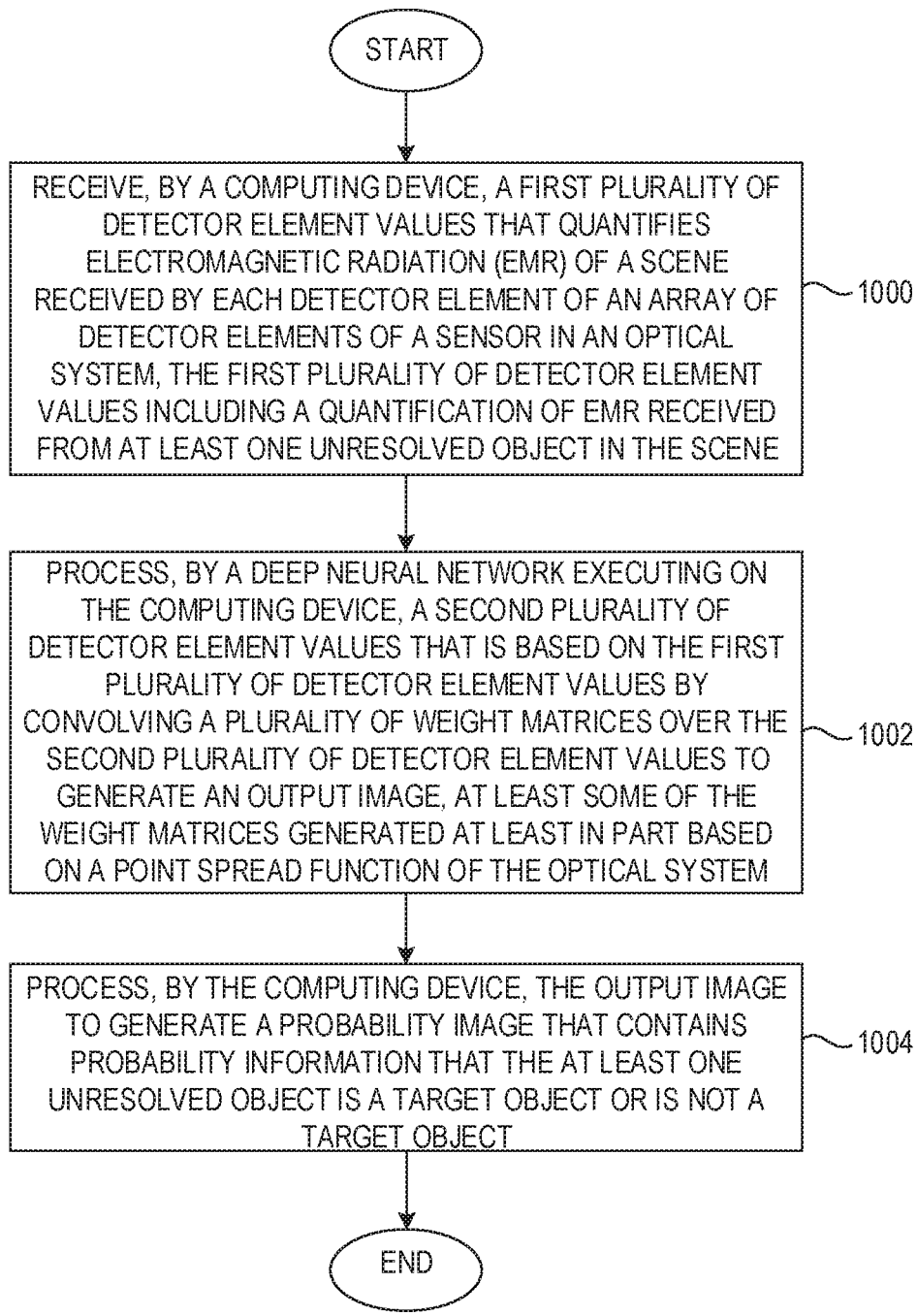
FIG. 2 is a flowchart of a method for unresolved object target detection using a deep neural network according to one embodiment.

FIG. 2 is a flowchart of a method for unresolved object target detection using a deep neural network according to one embodiment. FIG. 2 will be discussed in conjunction with FIG. 1. The computing device 16 receives, from the sensor 24, comprising the array of detector elements 25 in the optical system 14, the first plurality of detector element values 29 that quantifies EMR received by each detector element 25 from the scene 26. The first plurality of detector element values 29 includes a quantification of EMR received from at least one unresolved object 28-1-28-3 in the scene 26 (FIG. 2, block 1000).

It is noted that each detector element value 29 in the first plurality of detector element values 29 corresponds to a particular detector element 25 of the sensor 24, and that the first plurality of detector element values 29 is arranged in a manner that maintains such correspondence. Thus, the computing device 16 (and the deep neural network 30) can determine which detector element 25 corresponds to which detector element value 29. The deep neural network 30, executing on the computing device 16, processes a second plurality of detector element values that is based on the first plurality of detector element values 29 by convolving a plurality of weight matrices over the second plurality of detector elements, and after each convolution, applying a non-linear function to the output of the convolution, to generate an output image, at least some of the weight matrices being generated at least in part based on a point spread function of the optical system 14 (FIG. 2, block 1002). In this example, the second plurality of detector element values is identical to the first plurality of detector element values 29 because the first plurality of detector element values 29 was not preprocessed prior to being processed by the deep neural network 30. However, in other embodiments, as discussed below, prior to being processed by the deep neural network 30, the first plurality of detector element values 29 may be preprocessed and thereby altered in accordance with one or more preprocessing steps, resulting in a second plurality of detector element values that are based on the first plurality of detector element values 29, but whose values differ from the first plurality of detector element values 29 due to the preprocessing. However, even though the values of the second plurality of detector element values differ from the first plurality of detector element values 29, each detector element value in the second plurality of detector element values is based on and corresponds to a particular detector element value 29 in the first plurality of detector element values 29, and thus also corresponds to a particular detector element 25. The computing device 16 processes the output image to generate a probability image that contains probability information that the at least one unresolved object 28-1-28-3 is a target object or is not a target object (FIG. 2, block 1004).

Figure 3:
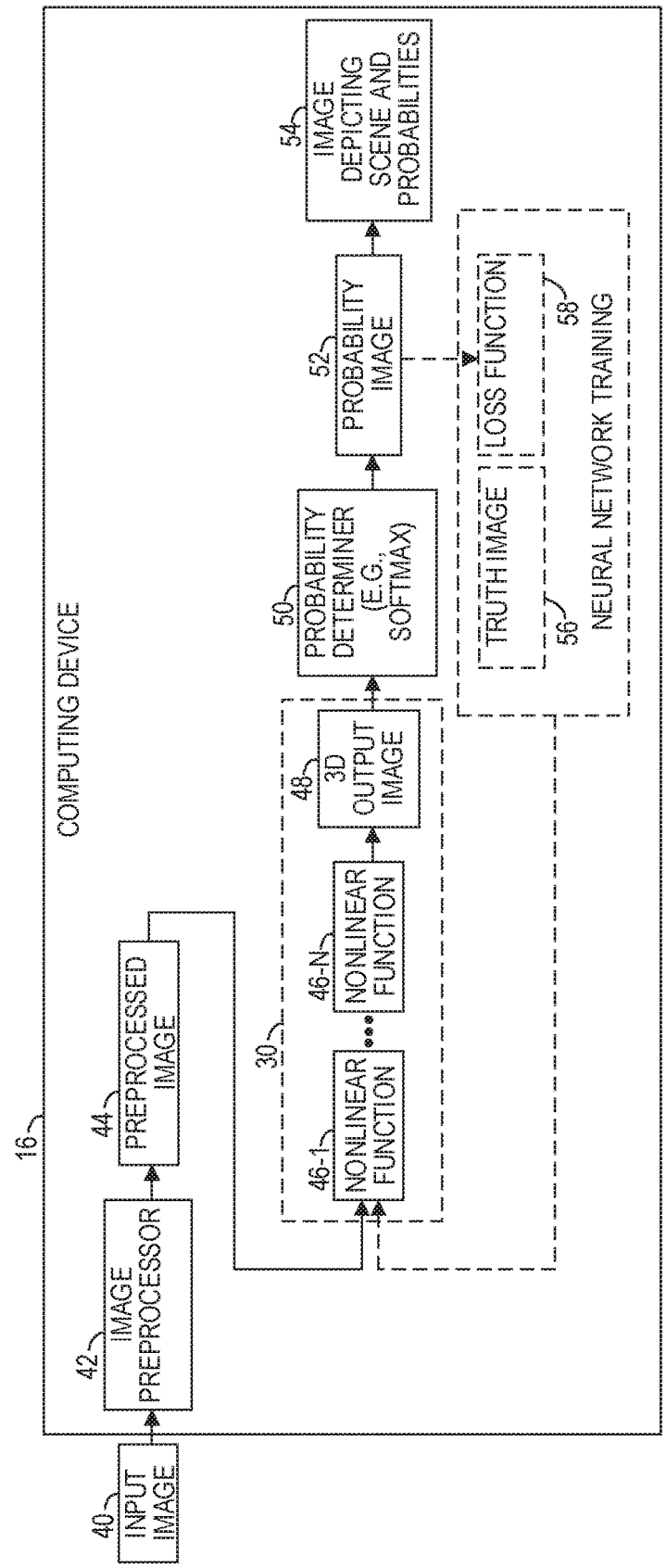
FIG. 3 is a block diagram of a system suitable for unresolved object target detection using a deep neural network according to one embodiment.

FIG. 3 is a block diagram of a system 38 suitable for unresolved object target detection using the deep neural network 30 according to one embodiment. The computing device 16 receives a first plurality of detector element values 29, referred to herein as input image 40, from the sensor 24 (FIG. 1). The input image 40 contains information that quantifies the EMR received by each respective detector element 25 from the scene 26 (FIG. 1). In some embodiments, an image preprocessor 42 may perform one or more preprocessing steps on the input image 40 to generate a preprocessed image 44 that contains a second plurality of detector element values. Such preprocessing may include, by way of non-limiting example, signal-interference ratio preprocessing and/or whitening preprocessing, both of which are described in greater detail below with regard to FIG. 4. The preprocessed image 44 is then provided to the deep neural network 30 that comprises a plurality of weight matrices 46-1-46-N, at least some of which are generated based on a point spread function of the optical system 14 (FIG. 1). The plurality of weight matrices 46-1-46-N and non-linear functions are configured to identify features in the input image 40, and generate an output image 48 that comprises data from which probabilities can be determined that each detector element has captured EMR from an unresolved object that is a target object.

A probability determiner 50 receives the output image 48 and generates, based on the output image 48, a probability image 52 that contains, for each detector element 25, a probability that the detector element 25 has received EMR from an unresolved object that is a target object, or, a probability that the detector element 25 has received EMR from an unresolved object that is not a target object. The probability determiner 50 may be any suitable process or function configured to generate, from the output of the weight matrices 46-1-46-N and the application of one or more nonlinear functions, the probability image 52. In some embodiments, the probability determiner 50 comprises the Softmax function.

The computing device 16 may then, in some embodiments, utilize the probability image 52, and the input image 40, to generate an output image 54 that depicts the scene 26 and the probabilities that some or all of the unresolved objects in the scene 26 are target objects or are not target objects. In some embodiments, the computing device 16 may only identify those unresolved objects that have a probability greater than some threshold, such as 50%, or may only show a predetermined number of unresolved objects that have the greatest probabilities of being a target object, such as the three unresolved objects that have the highest probabilities of being a target object.

During training, a truth image 56 that identifies which unresolved objects in the scene 26 are target objects rather than clutter may be used with a loss function 58 and a back propagation process to alter the weight matrices 46-1-46-N to more accurately identify unresolved objects as target objects.

While for purposes of illustration the deep neural network 30 is illustrated as including only the weight matrices 46-1-46-N, this is system dependent, and the deep neural network 30 may in other embodiments include the image preprocessor 42 and/or the probability determiner 50.

Figure 4:
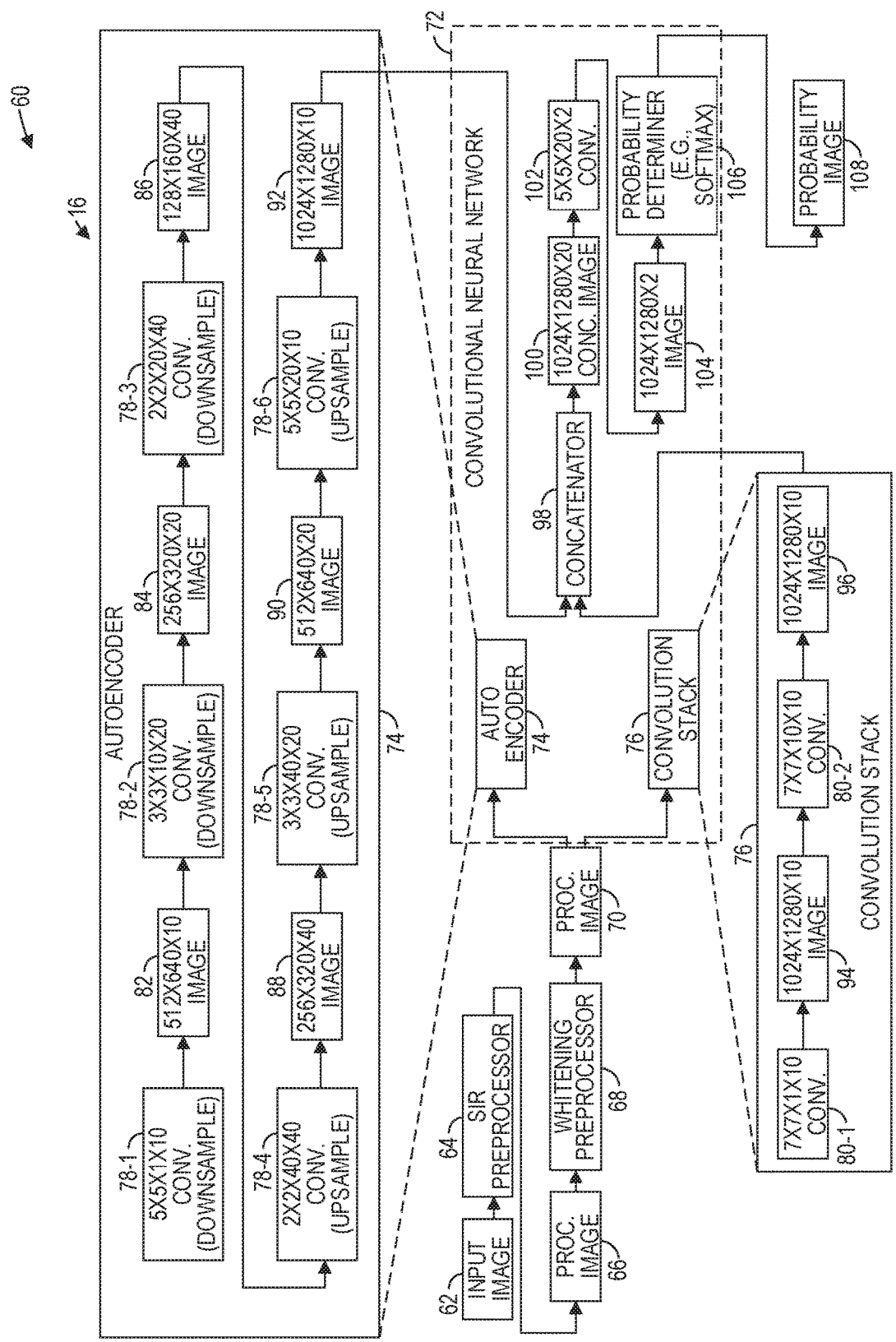
FIG. 4 is a block diagram of a system suitable for unresolved object target detection using a deep convolutional neural network according to one embodiment.

FIG. 4 is a block diagram of a system 60 suitable for unresolved object target detection using a deep convolutional neural network according to one embodiment. The computing device 16 receives a first plurality of detector element values 29, referred to herein as input image 62, from the sensor 24 (FIG. 1). The term "image" as used herein refers to a matrix of data that may be two-dimensional or three-dimensional. The input image 62 contains information that quantifies the EMR received by each respective detector element 25 from the scene 26 (FIG. 1). In some embodiments, a signal-interference ratio (SIR) preprocessor 64 may receive the input image 62 and perform SIR processing on the input image 62 to generate a processed image 66. In particular, the SIR preprocessor 64 determines the mean value of the detector element values, and subtracts the mean value from each detector element value. The SIR preprocessor 64 then divides each respective detector element value by the standard deviation of the 24 (or some other predetermined number) closest immediate neighbor detector element values. Note that the input image 62 contains detector element values that correspond to corresponding detector elements 25, and that the input image 62 maintains the same spatial relationship between the detector element values as the corresponding detector elements 25. Thus, "closest" refers to those detector element values that are spatially closest to the next respective detector element value. In essence, the calculated resulting value for each detector element 25 is a ratio of the detector element value to the noise of the neighbors of the detector element value. In some embodiments, the calculated resulting value for each detector element 25 is the ratio of the signal intensity (computed by the detector element value's difference from the local mean) to the noise, using a standard deviation (in some embodiments) of the 24 closest detector elements.

The processed image 66 may then be received by a whitening preprocessor 68. The whitening preprocessor 68 determines the mean from each processed detector element value in the processed image 66 and subtracts the mean from each processed detector element value. The whitening preprocessor 68 then determines the standard deviation of the processed detector element values and divides each processed detector element value by the standard deviation to generate a processed image 70. This results in the processed image 70 having a second plurality of detector element values that have been processed and that have a mean of zero, with most values being in a range between −1 to +1. It should be noted that this is but one example of whitening processing, and the embodiments may utilize other whitening processing algorithms.

The processed image 70 is then provided to a convolutional neural network 72 that comprises a plurality of parallel paths 74, 76 of weight matrices and non-linear functions, which, in this example, comprise several convolution layers. Each convolution layer comprises a set of matrices of values (e.g., weights). Each matrix is convolved over an input image that is input into the respective layer to generate a resultant image, and a non-linear activation function is then applied to the resultant image by element-wise evaluating each of the pixel values of the resultant image as the input to the non-linear activation function to produce an output image, sometimes referred to as an activation map, for that convolution layer. Several different convolution filters are applied to the input image within a single convolutional layer to produce a three-dimensional output image, or an activation map with several channels, where each channel is produced by a different filter in the convolutional layer.

The weights of the convolution filters were determined during a training process, as described in greater detail below, and at least some of the weights of the convolution filters are based in part on the point spread function of the optical system 14. The convolution filters may also be based in part on clutter provided in the training images during the training process. While for purposes of illustration only two parallel paths 74, 76 are shown, the embodiments may utilize any number of parallel paths, such as 3-12 parallel paths, or more.

In this example, the parallel path 74 is an autoencoder parallel path comprising a plurality of convolution layers 78-1-78-6. Each convolution layer 78-1-78-6 may include one or more three-dimensional arrays of matrices of weights: the width of the kernel, the length of the kernel, and the depth of the kernel. The width is equal to the length of the kernel and controls the receptive field for the kernel or the spatial extents of the kernel's connectivity. The depth of the kernel is always equal to the number of input channels presented to that layer. A single convolutional layer may process the same input image multiple times with different filters producing an output image with the number of channels equal to the number of filters. The autoencoder parallel path 74 includes three downsampling convolution layers 78-1-78-3, and three upsampling convolution layers 78-4-78-6. Each downsampling convolution layer 78-1-78-3 reduces the X,Y resolution of the received image, and each upsampling convolution layer 78-4-78-6 increases the X,Y resolution of the received image.

In this example, the parallel path 76 is a convolution stack parallel path comprising a plurality of convolution layers 80-1-80-2. The convolution layers 80-1-80-2 maintain the X,Y resolution of the received image.

For purposes of illustration, it will be assumed that the sensor 24 has a 1024×1280 resolution (i.e., comprises a matrix of 1024×1280 detector elements 25), and that the processed image 70 comprises a 1024×1280×1 resolution. A copy of the processed image 70 is provided to the convolution layer 78-1 of the autoencoder parallel path 74, which comprises a 5×5×10 downsampling convolution filter. The convolution layer 78-1 processes the processed image 70 to generate a reduced resolution (in the X,Y directions) image 82 having a resolution of 512×640×10 (thus, there are 10 activation maps of 512×640 values, and each activation map corresponds to a different feature). The convolution layer 78-2 receives the image 82 and processes the image 82 to generate a reduced resolution (in the X,Y directions) image 84 having a resolution of 256×320×20 (thus, there are 20 activation maps of 256×320 values). The convolution layer 78-3 receives the image 84 and processes the image 84 to generate a reduced resolution (in the X,Y directions) image 86 having a resolution of 128×160×40. The image 86 may be referred to as an intermediate image that was generated by the set of successive downsampling convolution layers 78-1-78-3. The convolution layer 78-4 receives the image 86 and processes the image 86 to generate an increased resolution (in the X,Y directions) image 88 having a resolution of 256×320×40. The convolution layer 78-5 receives the image 88 and processes the image 88 to generate an increased resolution (in the X,Y directions) image 90 having a resolution of 512×640×20. The convolution layer 78-6 receives the image 90 and processes the image 90 to generate an increased resolution (in the X,Y directions) image 92 having a resolution of 1024×1280×10. The image 92 is an output image from the autoencoder parallel path 74.

A copy of the processed image 70 is also provided in parallel to the convolution layer 80-1 of the convolution stack parallel path 76, which comprises a 7×7×1×10 convolution filter. The convolution layer 80-1 processes the processed image 70 to generate a same resolution (in the X,Y directions) image 94 having a resolution of 1024×1280×10 (thus, there are 10 activation maps of 1024×1280). The convolution layer 80-2 receives the image 94 and processes the image 94 to generate a same resolution (in the X,Y directions) image 96 having a resolution of 1024×1280×10. The image 96 is an output image from the convolution stack parallel path 76.

The image 92 from the autoencoder parallel path 74 and the image 96 from the convolution stack parallel path 76 are provided to a concatenator 98 which concatenates the image 92 and the image 96 to generate a concatenated image 100 that has a resolution of 1024×1280×20. A convolution filter 102 receives the image 96 and processes the image 96 to generate an image 104 having a resolution of 1024×1280×2. A probability generator 106, such as the Softmax function, receives the image 104 and generates a probability image 108 having a resolution, in this example, of 1024×1280×2. One layer of 1024×1280 values contains a probability that the EMR received by the corresponding detector element 25 is from a target object, and the other layer of 1024×1280 values contains a probability that the EMR received by the corresponding detector element 25 is not from a target object.

The probability image 108 may then be used, for example, to rank the potential target objects by probability, and then depict the scene 26 with the highest ranking target objects visually highlighted. In some embodiments, the computing device 16 may receive a successive plurality of sets of detector element values 29, each set of detector element values 29 being associated with a successive image of a scene. The convolutional neural network 72 may process each set of detector element values 29 as described above and maintain the probability image 108 generated for each set. The computing device 16 may utilize multiple probability images 108 before classifying an unresolved object as a target object based on the probability values for the unresolved object over the period of time corresponding to the multiple probability images 108.

Figure 5:
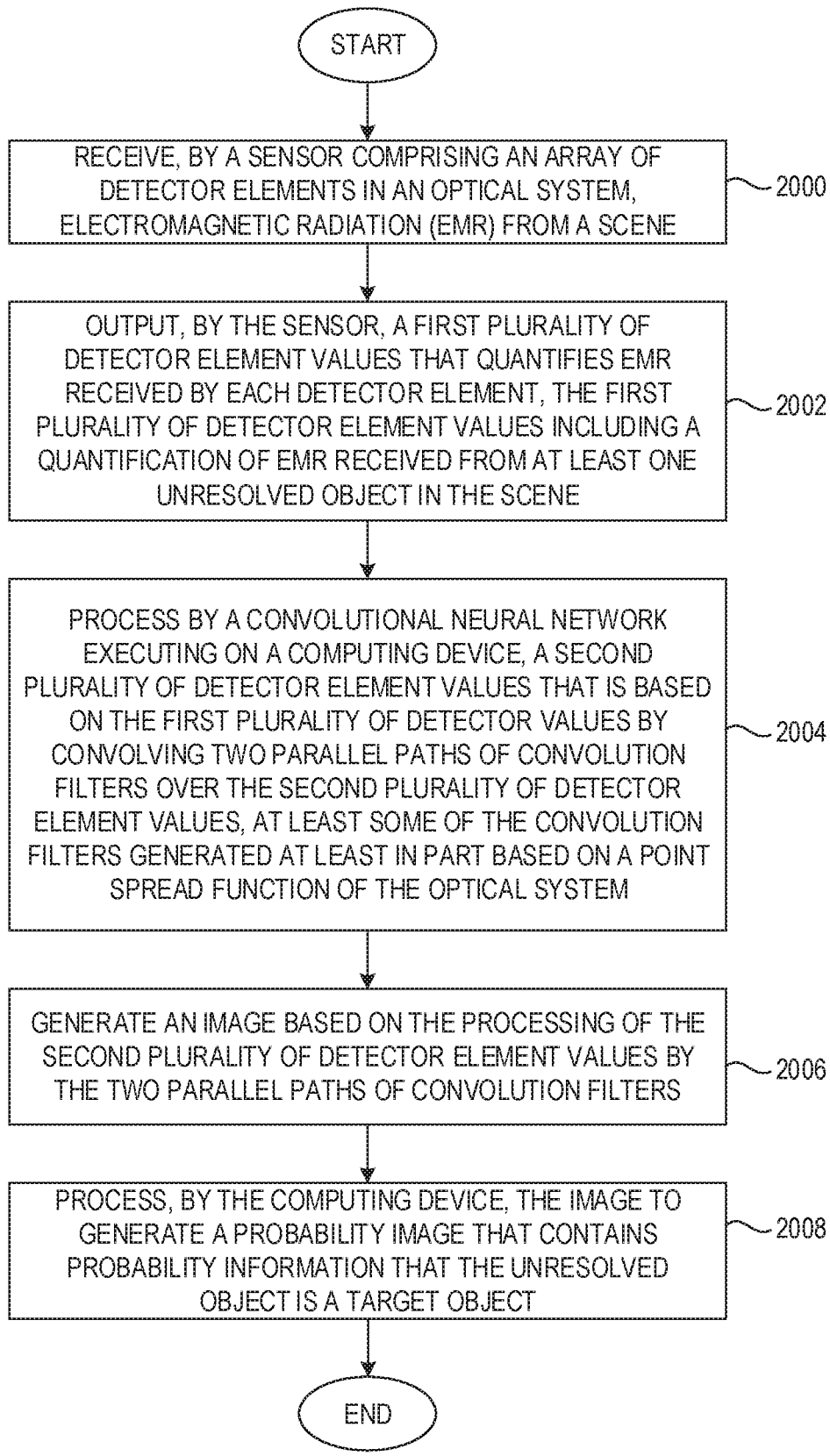
FIG. 5 is a flowchart of a method for unresolved object target detection using a convolutional neural network according to one embodiment.

FIG. 5 is a flowchart of a method for unresolved object target detection using a convolutional neural network according to one embodiment. FIG. 5 will be discussed in conjunction with FIGS. 4 and 1. The sensor 24, comprising the array of the plurality of detector elements 25 in the optical system 14, receives electromagnetic radiation (EMR) from the scene 26 (FIG. 5, block 2000). The sensor 24 outputs a first plurality of detector element values 29 that quantifies EMR received by each detector element 25, the first plurality of detector element values 29 including a quantification of EMR received from at least one unresolved object 28-1-28-3 in the scene 26 (FIG. 5, block 2002). The convolutional neural network 72 processes a second plurality of detector element values that is based on the first plurality of detector element values 29 by applying the two parallel paths 74, 76 of convolution layer 78-1-78-6 and 80-1-80-2 to the second plurality of detector element values. At least some of the convolution layers 78-1-78-6 and 80-1-80-2 are generated at least in part based on a point spread function of the optical system 14 (FIG. 5, block 2004). At least some of the convolution layers 78-1-78-6 and 80-1-80-2 may also be generated at least in part based on clutter in the images used during the training process. The convolutional neural network 72 generates the image 104 based on the processing of the second plurality of detector element values by the two parallel paths 74, 76 of convolution layers 78-1-78-6 and 80-1-80-2 of convolution filters (FIG. 5, block 2006). The computing device 16 processes the image 104 to generate the probability image 108 that contains probability information that the unresolved object is a target object or is not a target object (FIG. 5, block 2008).

Figure 6:
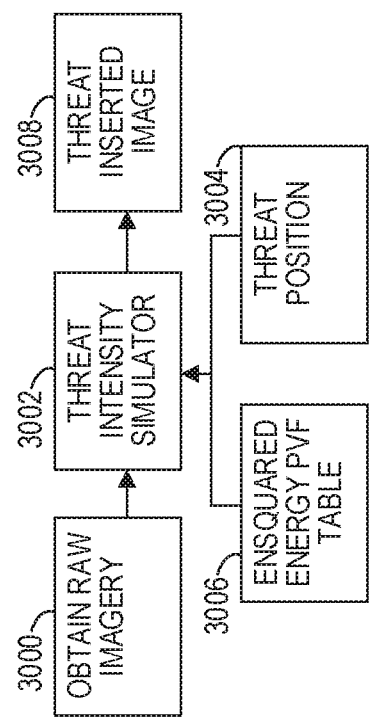
FIG. 6 is a block diagram illustrating training aspects of the convolutional neural network illustrated in FIG. 4 according to one embodiment.

FIG. 6 is a block diagram illustrating training aspects of the convolutional neural network 72 according to one embodiment. It will be appreciated that obtaining actual imagery containing unresolved objects that constitute target objects may be difficult or impractical under certain circumstances, especially, for example, where the target objects are not commonly encountered, such as enemy aircraft. The embodiments herein utilize the point spread function of the optical system 14 to generate simulated unresolved objects that constitute threats, and randomly insert such simulated unresolved objects into raw imagery to train the convolutional neural network 72. At block 3000, raw imagery of a conventional scene 26 is obtained. This may constitute, for example, video imagery taken by an aircraft while flying. A frame of such imagery is extracted. At block 3002, a threat simulator generates a simulated unresolved object that constitutes a threat. In particular, the threat intensity simulator selects a threat position 3004 in the frame of imagery. The threat intensity simulator selects an 11×11 pixel image chip from the frame of imagery at the threat position 3004 and masks out the center 7×7 pixels to generate a masked image chip. The threat intensity simulator determines the standard deviation of the image pixels in the background of the masked image chip. The threat intensity simulator utilizes an ensquared energy pulse-visibility factor (PVF) table 3006 to sample a 32×32 hypercube of 11×11 point spread functions at the pixel location of the threat. The PVF table 3006 may be generated, for example, using the point spread function and phases (or moves) the point spread function sub-pixel distances within a single pixel.

PVF is the average energy on the detector element for all possible spatial phases between the point spread function (PSF) and the detector area. Ensquared energy is the value of the center detector element divided by the sum of the values of the other detector elements including the center detector element in a local neighborhood, such as a 5×5 local neighborhood. Ensquared energy is a measure of a percentage of the target energy that is in the center detector element.

At block 3008, the sample is inserted via superposition into the image chip via a signal-noise ratio (SNR) above a variance SNR level of the image chip. This process results in a sub-pixel PVF of X SNR at the threat position 3004 in the frame of imagery.

This process may be repeated multiple times in the same frame of imagery to generate multiple unresolved objects that constitute threats in the frame of imagery. A truth image may be generated that identifies the location in the frame of imagery of the unresolved objects that constitute targets. The initial matrix of weights used by the convolution layers 78-1-78-6 and 80-1-80-2 may be arbitrary, or, in some embodiments, may utilize an Xavier uniform initialization. The frame of imagery may be processed by the convolutional neural network 72 during a training phase and, after the probability image 108 is generated, compared to the truth image. A cross-entropy and backpropagation process may be utilized to cause the convolutional neural network 72 to change the matrix of weights utilized by one or more of the convolution layers 78-1-78-6 and 80-1-80-2 to decrease any error (i.e., increase the accuracy of detecting the unresolved objects 28 that constitute target objects). This process may be repeated multiple times during the training phase of the convolutional neural network 72. This process may be weighted per target class.

Figure 7:
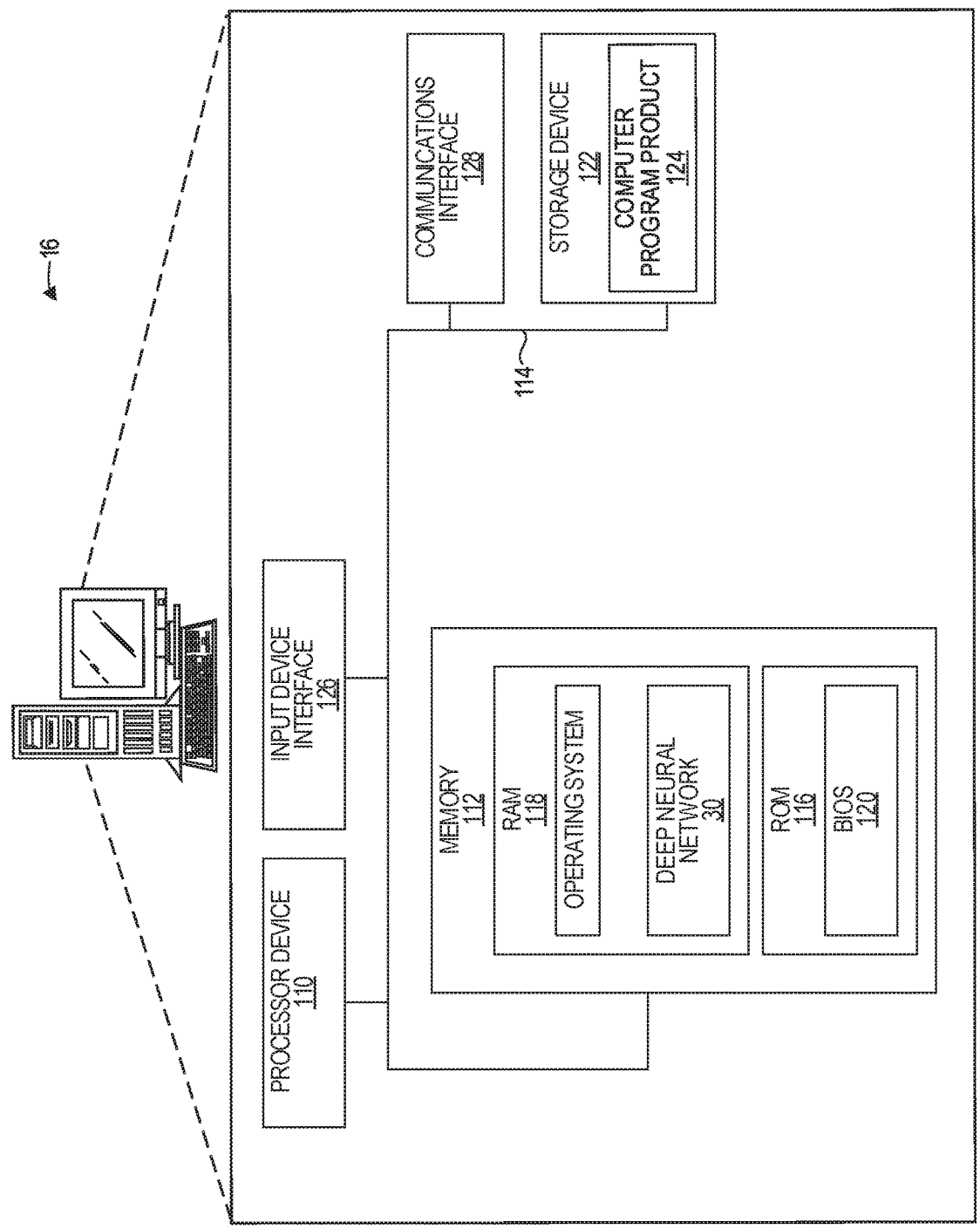
FIG. 7 is a block diagram of a computing device suitable for implementing embodiments disclosed herein according to one example.

FIG. 7 is a block diagram of the computing device 16 suitable for implementing embodiments disclosed herein according to one example. The computing device 16 may comprise any computing or electronic device capable of including firmware, hardware, and/or executing software instructions to implement the functionality described herein, such as a computer server, a desktop computing device, a laptop computing device, or the like. The computing device 16 includes a processor device 110, a system memory 112, and a system bus 114. The system bus 114 provides an interface for system components including, but not limited to, the system memory 112 and the processor device 110. The processor device 110 can be any commercially available or proprietary processor.

The system bus 114 may be any of several types of bus structures that may further interconnect to a memory bus (with or without a memory controller), a peripheral bus, and/or a local bus using any of a variety of commercially available bus architectures. The system memory 112 may include non-volatile memory 116 (e.g., read-only memory (ROM), erasable programmable read-only memory (EPROM), electrically erasable programmable read-only memory (EEPROM), etc.), and volatile memory 118 (e.g., random-access memory (RAM)). A basic input/output system (BIOS) 120 may be stored in the non-volatile memory 116 and can include the basic routines that help to transfer information between elements within the computing device 16. The volatile memory 118 may also include a high-speed RAM, such as static RAM, for caching data.

The computing device 16 may further include or be coupled to a non-transitory computer-readable storage medium such as a storage device 122, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 122 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 122 and in the volatile memory 118, including an operating system and one or more program modules, such as the deep neural network 30, which may implement the functionality described herein in whole or in part.

All or a portion of the examples may be implemented as a computer program product 124 stored on a transitory or non-transitory computer-usable or computer-readable storage medium, such as the storage device 122, which includes complex programming instructions, such as complex computer-readable program code, to cause the processor device 110 to carry out the steps described herein. Thus, the computer-readable program code can comprise software instructions for implementing the functionality of the examples described herein when executed on the processor device 110. The processor device 110, in conjunction with the deep neural network 30 in the volatile memory 118, may serve as a controller, or control system, for the computing device 16 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 110 through an input device interface 126 that is coupled to the system bus 114 but can be connected by other interfaces such as a parallel port, an Institute of Electrical and Electronic Engineers (IEEE) 1394 serial port, a Universal Serial Bus (USB) port, an IR interface, and the like. The computing device 16 may also include a communications interface 128 suitable for communicating with a network as appropriate or desired.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
    receiving, by a computing device, a first plurality of detector element values that quantifies electromagnetic radiation (EMR) of a scene received by each detector element of an array of detector elements of a sensor in an optical system, the first plurality of detector element values including a quantification of EMR received from at least one unresolved object in the scene;
    processing, by a deep neural network executing on the computing device, a second plurality of detector element values that is based on the first plurality of detector values by convolving a plurality of weight matrices over the second plurality of detector element values to generate an output image, at least some of the weight matrices generated at least in part based on a point spread function of the optical system, by:
        processing the second plurality of detector element values in a first parallel path comprising a first plurality of weight matrices and non-linear functions to form a first output image;
        processing the second plurality of detector element values in a second parallel path comprising a second plurality of weight matrices and non-linear functions to form a second output image; and
        concatenating the first output image and the second output image to generate a combined output image; and
    processing, by the computing device, the output image to generate a probability image that contains probability information that the at least one unresolved object is a target object or is not a target object.

2. The method of claim 1 wherein:
    the deep neural network comprises a convolutional neural network (CNN);
    the first plurality of weight matrices comprises a first plurality of convolution filters;
    the second plurality of weight matrices comprises a second plurality of convolution filters;
    the second plurality of detector element values has an original resolution based on a number of detector elements in the array of detector elements; and
    wherein processing the second plurality of detector element values in the first parallel path comprising the first plurality of weight matrices to form the first output image further comprises:
        processing the second plurality of detector element values in the first parallel path with a first set of successive downsampling convolution filters to generate an intermediate image having a lower resolution than the original resolution; and
        processing the intermediate image with a set of upsampling convolution filters to generate the first output image that has a same resolution as the original resolution; and
    wherein processing the second plurality of detector element values in the second parallel path comprising the second plurality of weight matrices to form the second output image further comprises:
        processing the second plurality of detector element values in the second parallel path with a set of successive convolution filters that generate a plurality of intermediate images that have the same resolution as the original resolution to generate the second output image that has the same resolution as the original resolution.

3. The method of claim 2 further comprising generating at least some of the convolution filters by, at least in part:
    based on a point spread function of the optical system, inserting, into a training image, a plurality of unresolved objects at random locations, some of the unresolved objects comprising target objects and others of the unresolved objects comprising non-target objects;
    generating truth data that identifies which unresolved objects are target objects and which unresolved objects are non-target objects;
    processing, by the CNN, the training image by convolving a plurality of convolution filters over a plurality of detector element values to generate an image;
    processing, by the CNN, the image to generate a probability for each unresolved object of the plurality of unresolved objects that the unresolved object is a target object; and altering, by the CNN, the at least some of the convolution filters, based on a comparison between the truth data and the probability of each unresolved object of the plurality of unresolved objects that the unresolved object is a target object.

4. The method of claim 1 further comprising:
prior to processing the second plurality of detector element values with the deep learning network, determining a mean value for the first plurality of detector element values; and
for each detector element value in the first plurality of detector element values:
removing the mean value from each detector element value;
determining a standard deviation value from a set of detector element values comprising the detector element value and a plurality of spatially nearest detector element values; and
dividing the detector element value by the standard deviation value to generate a new detector element value in the second plurality of detector element values.

5. The method of claim 1 further comprising generating at least some of the plurality of weight matrices by, at least in part:
based on a point spread function of the optical system, inserting, into a training image, a plurality of unresolved objects at random locations, some of the unresolved objects comprising target objects and others of the unresolved objects comprising non-target objects;
generating truth data that identifies which unresolved objects are target objects and which unresolved objects are non-target objects;
processing, by a CNN, the training image by convolving a plurality of weight matrices over a plurality of detector element values to generate an image;
processing, by the CNN, the image to generate a probability for each unresolved object of the plurality of unresolved objects that the unresolved object is a target object; and
altering, by the CNN, the at least some of the plurality of weight matrices, based on a comparison between the truth data and the probability of each unresolved object of the plurality of unresolved objects that the unresolved object is a target object.

6. The method of claim 1 further comprising:
generating an image that depicts the scene;
generating indicia on the image that identifies the at least one unresolved object as a target object; and
presenting the image on a display device.

7. A computing device comprising:
a memory; and
a processor device coupled to the memory, the processor device configured to:
receive a first plurality of detector element values that quantifies electromagnetic radiation (EMR) of a scene received by each detector element of an array of detector elements of a sensor in an optical system, the first plurality of detector element values including a quantification of EMR received from at least one unresolved object in the scene;
process, by a deep neural network executing on the computing device, a second plurality of detector element values that are based on the first plurality of detector values by convolving a plurality of weight matrices over the second plurality of detector element values to generate an output image, at least some of the weight matrices generated at least in part based on a point spread function of the optical system, by:
processing the second plurality of detector element values in a first parallel path comprising a first plurality of weight matrices and non-linear functions to form a first output image;
processing the second plurality of detector element values in a second parallel path comprising a second plurality of weight matrices and non-linear functions to form a second output image; and
concatenating the first output image and the second output image to generate a combined output image; and
process the output image to generate a probability image that contains probability information that the at least one unresolved object is a target object or is not a target object.

8. The computing device of claim 7 wherein:
the deep neural network comprises a convolutional neural network (CNN);
the first plurality of weight matrices comprises a first plurality of convolution filters;
the second plurality of weight matrices comprises a second plurality of convolution filters;
the second plurality of detector element values has an original resolution based on a number of detector elements in the array of detector elements; and
wherein to process the second plurality of detector element values in the first parallel path comprising the first plurality of weight matrices to form the first output image further, the processor device is further configured to:
process the second plurality of detector element values in the first parallel path with a first set of successive downsampling convolution filters to generate an intermediate image having a lower resolution than the original resolution; and
process the intermediate image with a set of upsampling convolution filters to generate the first output image that has a same resolution as the original resolution; and
wherein to process the second plurality of detector element values in the second parallel path comprising the second plurality of weight matrices to form the second output image further, the processor device is further configured to:
process the second plurality of detector element values in the second parallel path with a set of successive convolution filters that generate a plurality of intermediate images that have the same resolution as the original resolution to generate the second output image that has the same resolution as the original resolution.

9. The computing device of claim 8 wherein the processor device is further configured to generate at least some of the convolution filters by, at least in part:
based on a point spread function of the optical system, inserting, into a training image, a plurality of unresolved objects at random locations, some of the unresolved objects comprising target objects and others of the unresolved objects comprising non-target objects;
generating truth data that identifies which unresolved objects are target objects and which unresolved objects are non-target objects;

processing, by the CNN, the training image by convolving a plurality of convolution filters over a plurality of detector element values to generate an image;

processing, by the CNN, the image to generate a probability for each unresolved object of the plurality of unresolved objects that the unresolved object is a target object; and altering, by the CNN, the at least some of the convolution filters, based on a comparison between the truth data and the probability of each unresolved object of the plurality of unresolved objects that the unresolved object is a target object.

10. The computing device of claim 7 wherein the processor device is further configured to:

prior to processing the second plurality of detector element values with the deep learning network, determine a mean value for the first plurality of detector element values; and for each detector element value in the first plurality of detector element values:
remove the mean value from each detector element value;
determine a standard deviation value from a set of detector element values comprising the detector element value and a plurality of spatially nearest detector element values; and
divide the detector element value by the standard deviation value to generate a new detector element value in the second plurality of detector element values.

11. The computing device of claim 7 wherein the processor device is further configured to generate at least some of the weight matrices by, at least in part:

based on a point spread function of the optical system, insert, into a training image, a plurality of unresolved objects at random locations, some of the unresolved objects comprising target objects and others of the unresolved objects comprising non-target objects;

generate truth data that identifies which unresolved objects are target objects and which unresolved objects are non-target objects;

process, by a CNN, the training image by convolving a plurality of weight matrices over a plurality of detector element values to generate an image;

process, by the CNN, the image to generate a probability for each unresolved object of the plurality of unresolved objects that the unresolved object is a target object; and alter, by the CNN, the at least some of the plurality of weight matrices, based on a comparison between the truth data and the probability of each unresolved object of the plurality of unresolved objects that the unresolved object is a target object.

12. The computing device of claim 7 wherein the processor device is further configured to:
generate an image that depicts the scene;
generate indicia on the image that identifies the at least one unresolved object as a target object; and
present the image on a display device.

13. A computer program product stored on a non-transitory computer-readable storage medium and including instructions configured to cause a processor device to:

receive a first plurality of detector element values that quantifies electromagnetic radiation (EMR) of a scene received by each detector element of an array of detector elements of a sensor in an optical system, the first plurality of detector element values including a quantification of EMR received from at least one unresolved object in the scene;

process, by a deep neural network executing on the processor device, a second plurality of detector element values that is based on the first plurality of detector values by convolving a plurality of weight matrices over the second plurality of detector element values to generate an output image, at least some of the weight matrices generated at least in part based on a point spread function of the optical system, by:
processing the second plurality of detector element values in a first parallel path comprising a first plurality of weight matrices and non-linear functions to form a first output image;
processing the second plurality of detector element values in a second parallel path comprising a second plurality of weight matrices and non-linear functions to form a second output image; and
concatenating the first output image and the second output image to generate a combined output image; and process the output image to generate a probability image that contains probability information that the at least one unresolved object is a target object or is not a target object.

14. The computer program product of claim 13 wherein:
the deep neural network comprises a convolutional neural network (CNN);
the first plurality of weight matrices comprises a first plurality of convolution filters;
the second plurality of weight matrices comprises a second plurality of convolution filters;
the second plurality of detector element values has an original resolution based on a number of detector elements in the array of detector elements; and
wherein to process the second plurality of detector element values in the first parallel path comprising the first plurality of weight matrices to form the first output image further, the instructions are further configured to cause the processor device to:
process the second plurality of detector element values in the first parallel path with a first set of successive downsampling convolution filters to generate an intermediate image having a lower resolution than the original resolution; and
process the intermediate image with a set of upsampling convolution filters to generate the first output image that has a same resolution as the original resolution; and
wherein to process the second plurality of detector element values in the second parallel path comprising the second plurality of weight matrices to form the second output image further, the instructions are further configured to cause the processor device to:
process the second plurality of detector element values in the second parallel path with a set of successive convolution filters that generate a plurality of intermediate images that have the same resolution as the original resolution to generate the second output image that has the same resolution as the original resolution.

15. The computer program product of claim 14 wherein the instructions are further configured to cause the processor device to generate at least some of the convolution filters by, at least in part:
based on a point spread function of the optical system, inserting, into a training image, a plurality of unresolved objects at random locations, some of the unresolved objects comprising target objects and others of the unresolved objects comprising non-target objects;

generating truth data that identifies which unresolved objects are target objects and which unresolved objects are non-target objects;

processing, by the CNN, the training image by convolving a plurality of convolution filters over a plurality of detector element values to generate an image;

processing, by the CNN, the image to generate a probability for each unresolved object of the plurality of unresolved objects that the unresolved object is a target object; and altering, by the CNN, at least some of the convolution filters, based on a comparison between the truth data and the probability of each unresolved object of the plurality of unresolved objects that the unresolved object is a target object.

16. The computer program product computing device of claim 13 wherein the instructions are further configured to cause the processor device to:

generate an image that depicts the scene;

generate indicia on the image that identifies the at least one unresolved object as a target object; and present the image on a display device.

* * * * *